US008886607B2

(12) United States Patent
Yucel et al.

(10) Patent No.: US 8,886,607 B2
(45) Date of Patent: *Nov. 11, 2014

(54) CLUSTER CONFIGURATION BACKUP AND RECOVERY

(71) Applicant: NetApp Inc., Sunnyvale, CA (US)

(72) Inventors: Sakir Yucel, Wexford, PA (US); Ronald William Kownacki, Pittsburgh, PA (US); Srinivasan Vijayarangan, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,983

(22) Filed: Apr. 26, 2013

(65) Prior Publication Data

US 2013/0238554 A1    Sep. 12, 2013

Related U.S. Application Data

(63) Continuation of application No. 12/970,523, filed on Dec. 16, 2010, now Pat. No. 8,484,163.

(51) Int. Cl.
*G06F 17/30* (2006.01)
*G06F 11/14* (2006.01)

(52) U.S. Cl.
CPC ...... *G06F 17/30289* (2013.01); *G06F 11/1438* (2013.01); *G06F 11/1415* (2013.01)
USPC ........... 707/640; 707/641; 707/650; 707/652; 707/653; 707/686; 707/674; 707/675; 707/676; 707/677; 707/678; 707/679; 709/201; 709/203; 709/213; 709/217; 709/220; 370/216

(58) Field of Classification Search
CPC .......... G06F 17/30289; G06F 11/1438; G06F 11/1415

USPC ........ 707/640–641, 650, 652–653, 674–679, 707/686; 709/201, 203, 213, 217, 220; 370/216

See application file for complete search history.

(56) References Cited

U.S. PATENT DOCUMENTS 4,956,835 A    9/1990 Grover
5,463,615 A   10/1995 Steinhorn
(Continued)

OTHER PUBLICATIONS

Notice of Allowance cited in related U.S. Appl. No. 12/970,523 Dated: Mar. 11, 2013 pp. 1-13.

(Continued)

*Primary Examiner* — Frantz Coby
(74) *Attorney, Agent, or Firm* — Cooper Legal Group, LLC

(57) ABSTRACT

A cluster network environment may comprise a plurality of nodes configured to perform various tasks, such as data I/O, storage, backup, etc. It may be advantageous to improve disaster recovery and reliability by creating backups that may be used to restore the cluster network environment and/or nodes therein. Accordingly, one or more techniques and/or systems are disclosed for restoring a cluster network environment and/or nodes therein. In particular, cluster configuration data, which may be stored in a healthy node or at a remote source, may be used to restore a node affected by an integrity loss. If the integrity loss affects the cluster network environment (e.g., a majority of healthy nodes are lost), then a new cluster network environment may be created from a healthy node or a restored healthy node. The creation of the new cluster network environment may be based at least in part on cluster configuration data.

20 Claims, 11 Drawing Sheets

(56) References Cited

U.S. PATENT DOCUMENTS

| | | |
|---|---|---|
| 6,360,330 B1 | 3/2002 | Mutalik |
| 7,848,224 B2 | 12/2010 | Bryant |
| 7,869,350 B1 | 1/2011 | Bryant |
| 7,925,625 B2 | 4/2011 | Mathew |
| 7,933,197 B2 | 4/2011 | Bryant |
| 8,200,667 B2 * | 6/2012 | Choe et al. .................... 707/733 |
| 8,484,163 B1 * | 7/2013 | Yucel et al. ................... 707/640 |
| 2007/0115810 A1 | 5/2007 | Stamatelakis |
| 2009/0083088 A1 | 3/2009 | Mathew |
| 2010/0220584 A1 | 9/2010 | DeHaan |
| 2011/0060945 A1 | 3/2011 | Leprince |
| 2011/0213753 A1 | 9/2011 | Manmohan |
| 2012/0078847 A1 * | 3/2012 | Bryant et al. ................. 707/647 |
| 2012/0151136 A1 | 6/2012 | Hay |
| 2012/0254535 A1 | 10/2012 | Hay |

OTHER PUBLICATIONS

Amendment cited in related U.S. Appl. No. 12/970,523 Dated: Jan. 11, 2013 pp. 1-17.

Non Final Office Action cited in related U.S. Appl. No. 12/970,523 Dated: Oct. 11, 2012 pp. 1-22.

* cited by examiner

CLUSTER CONFIGURATION BACKUP AND RECOVERY

RELATED APPLICATIONS

This application is a continuation of U.S. application Ser. No. 12/970,523, filed on Dec. 16, 2010, entitled "CLUSTER CONFIGURATION BACKUP AND RECOVERY", at least some of which may be incorporated herein.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented. For example, a cluster network environment comprising a plurality of nodes (e.g., one or more storage servers, one or more computing devices, etc.) may be used to facilitate the storage, retrieval, and/or processing of data. The nodes may cooperate together as a single coherent storage system (e.g., clustered storage environment and/or cluster of storage appliances).

The cluster network environment may support various features, such as a virtual file system. The virtual file system may utilize data replication and/or distributed calls so that user data may be stored, accessed, and/or processed across one or more nodes. For example, replicated configuration data (e.g., location of volumes, IP address configuration, cluster services, etc.) may be replicated across respective nodes within the cluster network environment. Respective nodes may comprise replicated configuration data, such that a single node may provide an administrative view of the entire cluster. Additionally, the cluster network environment may support distributed applications that may execute across one or more nodes. Respective nodes may comprise replicated application configuration data, such that a single node may provide an application view of the distributed applications.

Ideally, the cluster network environment may be able to tolerate integrity loss or "break" within the cluster without loss of availability (e.g., user data may still be accessible, distributed applications may still be executable, etc.). Integrity loss may occur from failure of a node, data loss, communication loss, a quorum loss (e.g., a failure of a majority of nodes resulting in a cluster network environment integrity loss), etc. Currently, very complex and fine grain commands may be used to restore integrity to nodes and/or the cluster network environment. For example, services may be shut down, nodes may be isolated, restoration may be performed, etc. Unfortunately, restoration may merely entail an administrator choosing a replica of a node, which may or may not comprise correct configuration data for the node to operate within the cluster network environment. Restoration may be further complicated because of the cluster computing aspect of the cluster network environment. That is, the cluster network environment (e.g., cluster storage system) may have a persistent state that may be associated with multiple instances of multiple services that may execute on multiple nodes, which may require extensive data synchronization. In contrast, a standard storage system may not have a persistent state, thus a simple restoration may merely comprise restoring a node from a selected backup without consideration of state and/or configuration of a network and/or computing devices therein.

SUMMARY

The disclosure relates to one or more techniques and/or systems that provide for backup and/or restoration of a cluster network environment, such as configuration, infrastructure, and/or management of the cluster network environment, and/or one or more nodes therein. In this manner, where cluster-wide integrity remains sound, a node, for example, may transparently be restored (e.g., automatically restored) into a cluster network environment while the cluster network environment operates normally. For example, notification of an integrity loss may be determined and/or received. If the integrity loss is associated with a node, then a local configuration may be restored to the node (e.g., node name, IP address, operating system parameters, local data, state information, local identity, etc.). In one example, local configuration may be restored to the node using a backup of the local configuration, such as node backup data, stored within a tarball, mega tarball, and/or any other type of backup. Additionally, a cluster configuration may be restored to the node (e.g., information regarding cluster services, data volume locations, data block locations, user IDs, file access configuration, virtual servers, database configurations, cluster rules, cluster management data, and/or other data associated with the operation of the cluster network environment). The cluster configuration may comprise data, such as database information, IP address information, and/or other data, that may be used to provide a coherent/equivalent view of the cluster network environment from any node. In one example, the cluster configuration data may be restored using cluster backup data from a healthy node within the cluster network environment. In another example, the cluster configuration data may be restored using cluster backup data from a remote source (e.g., a remote source accessibly through a URL. The restored node may be introduced (back) into the cluster network environment based upon the cluster configuration of the restored node. In another example, the cluster configuration data may be restored by synchronizing the node with the cluster network environment. It may be appreciated that synching, synchronizing, etc. a node with a cluster network environment may be interpreted in one example as a technique for restoring cluster configuration data to the node (e.g., where the cluster configuration data may be obtained in one example from operating data of a new cluster network environment, where the cluster network environment may have failed and thus been recreated). It may be appreciated that the restoration of the cluster configuration data to the node may mitigate potential inconsistencies and/or incompatibilities that may occur when introducing the node (back) into the cluster network environment, where introducing may be interpreted, for example, as making the node eligible for operating within the cluster network environment, for example.

In one example of restoring the cluster network environment, if the integrity loss affected the cluster network environment (e.g., a quorum of healthy nodes may not exist because a majority of nodes failed), then a new cluster network environment may be created based upon a healthy node within the cluster network environment. For example, the healthy node may be used to create a one-node cluster network environment comprising the healthy node (e.g., cluster backup data of the healthy node may be used to create the one-node cluster environment, which may be similar to the original cluster network environment). It may be appreciated that a new cluster network environment may be interpreted as a recreation of the cluster network environment. In this way, respective nodes affected by the integrity loss may be introduced to the new cluster network environment. In particular, for respective nodes affected by the integrity loss, a local configuration may be restored to an affected node. In one example, a cluster configuration may be restored to the affected node using cluster backup data from the healthy node. In another example, the cluster configuration may be restored to the affected node by synchronizing the affected node with the cluster. In one example, the restored node may be introduced to a new cluster network environment using the cluster backup data from the healthy node and/or using the restored cluster configuration data of the restored node. In another example, the restored node may be introduced to a new cluster network environment based upon cluster operating data associated with the new cluster network environment.

In one example, the new cluster network environment may be similar to the original cluster network environment (e.g., the new cluster network environment may have been created from cluster backup data of the healthy node), thus nodes not affected by the integrity loss may already be configured to operate on the new cluster network environment. In another example, the new cluster network environment may differ from the original cluster network environment, thus nodes not affected by the integrity loss may be introduced to the new cluster network environment.

In another example of restoring the cluster network environment, if integrity loss is associated with the cluster network environment, then a new cluster network environment may be created. A node affected by the integrity loss may be restored to generate a healthy node by restoring a local configuration and/or a cluster configuration to the node to generate the healthy node (a restored healthy node). In one example, the cluster configuration may be restored to the node using cluster backup data (e.g., cluster backup data from a healthy node unaffected by the integrity loss or from a remote source). In another example, the cluster configuration may be restored from the new cluster network environment to the node by synchronizing the node with the new cluster network environment (e.g., synching the node with cluster operating data associated with the new cluster network environment). In particular, data replication service directories on the node may be removed (e.g., data associated with a data replication service that replicates data, such as configuration data, across nodes within the cluster network environment). The data replication service directories on the node may be repopulated from a data replication service operating within the new cluster network environment.

A new cluster network environment may be created based upon the healthy node (the restored healthy node) within the cluster network environment. For respective nodes affected by the integrity loss, a local configuration may be restored to an affected node. Additionally, a cluster configuration may be restored to the affected node using the cluster configuration from the healthy node. The restored node may be introduced to the new cluster network environment. In one example, the new cluster network environment may be configured differently than the original cluster network environment, thus nodes unaffected by the integrity loss may be synchronized with the new cluster network environment using the cluster configuration data from the healthy node.

It may be appreciated that in one example, a cluster network environment may be interpreted as a cluster storage environment (e.g., storage cluster or cluster of storage applications as opposed to a computer farm).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
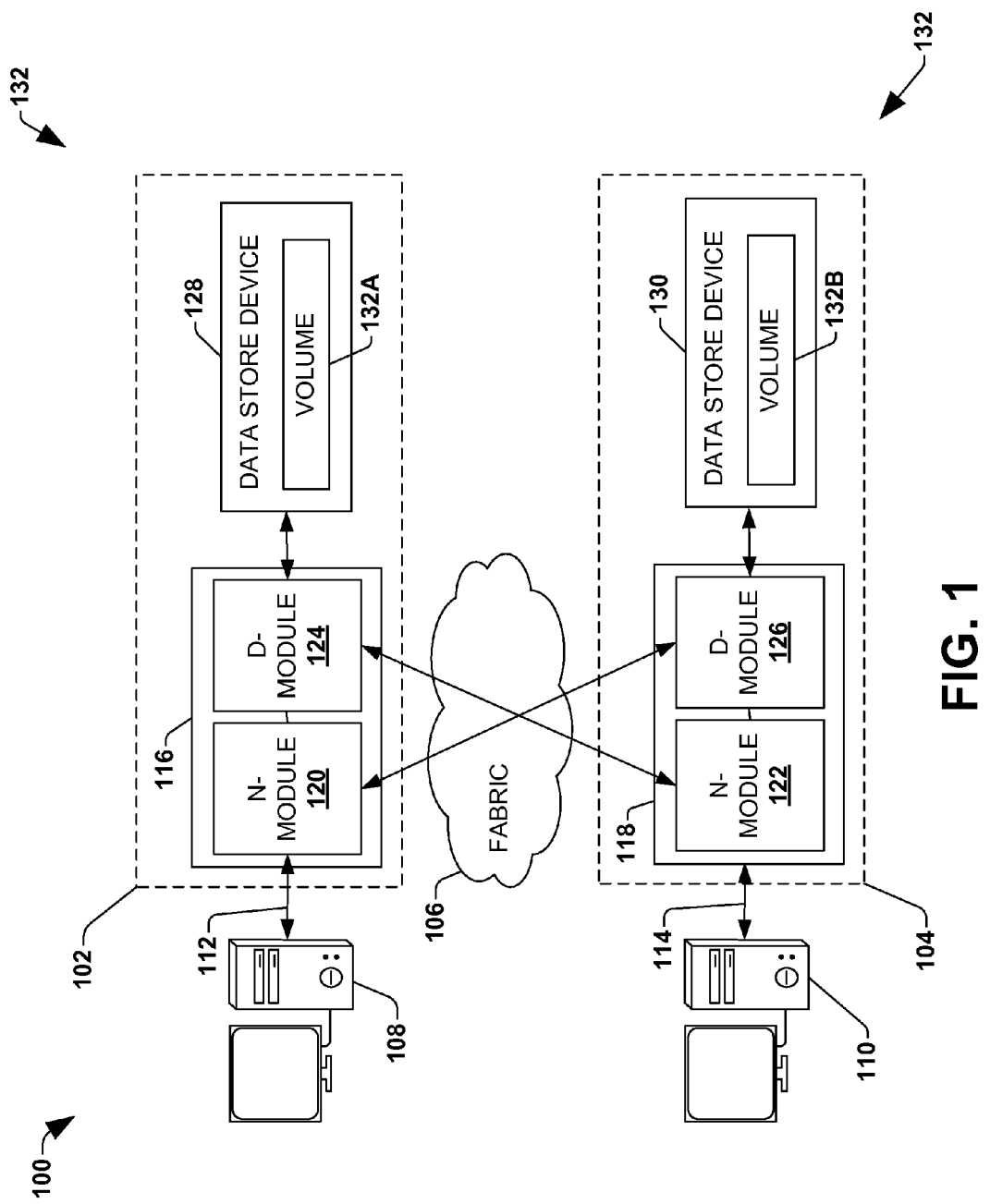
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

In a cluster network environment, clients may store, access, and/or process data across a plurality of nodes (e.g., one or more). In particular, tasks may be executed across nodes of the cluster network environment to facilitate such storage, access, and/or processing of data. Additionally, tasks may be executed to perform administrative jobs, such as data backup, node health monitoring, movement of data, configuration, etc. It may be advantageous to back up and/or restore the cluster network environment and/or nodes therein without affecting availability of the cluster network environment (e.g., user data may still be accessible, data replication may still be performed, etc.). Unfortunately, backup and/or restoration of a cluster network environment and/or nodes therein may be difficult because of the persistent state and extensive data synchronization associated with the cluster network environment. For example, rejoining a node with merely restored local configuration data may cause inconsistencies and/or incompatibilities throughout the cluster network environment (e.g., the rejoined node may be configured with inconsistent IP addresses for other nodes, inconsistent volume data locations, inconsistent cluster rules, and/or other incompatible cluster configurations, etc.). Accordingly, as provided herein, cluster configuration data may be backed up and/or used to restore a cluster network environment and/or nodes therein. Among other things, this provides for a failed node's participation in a cluster network environment to be restored in a coherent manner despite the complex nature of a cluster network environment where nodes operate together based upon distributed data, distributed applications, and/or persistent state, for example.

Figure 2:
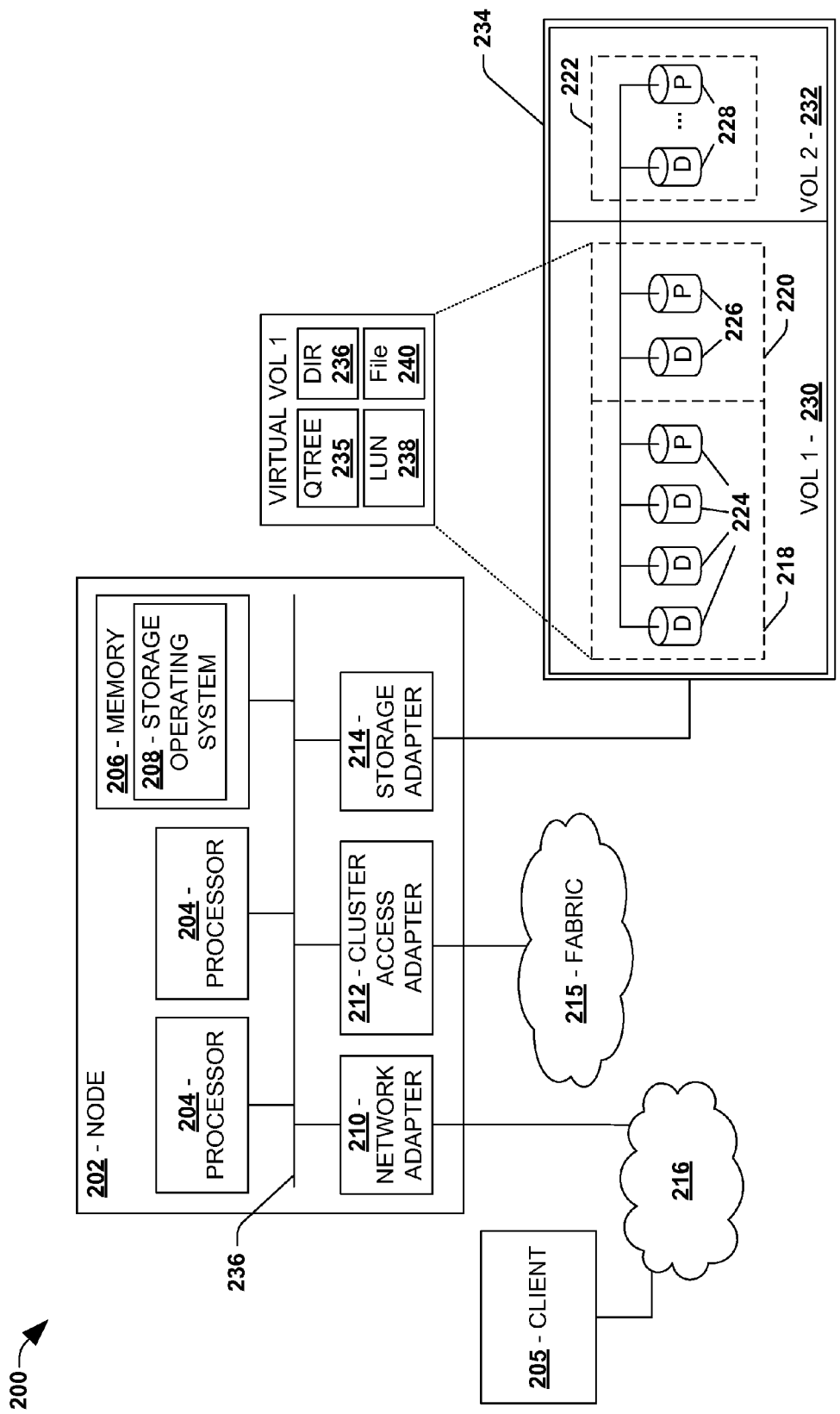
FIG. 2 is a component block diagram illustrating an example data storage system in accordance with one or more of the provisions set forth herein.

To provide a context for an embodiment for restoring a cluster network environment and/or nodes therein, FIG. 1 illustrates a clustered network environment 100, and FIG. 2 illustrates an embodiment of a data storage system that may be implemented to store and manage data in this clustered network environment, including cluster backup data and/or node backup data. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 wherein one or more of the techniques and/or systems described herein may be implemented. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality (e.g., one or more) of storage systems and/or nodes located in a plurality (e.g., one or more) of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality (e.g., one or more) of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

As provided herein, among other things, one or more systems and/or techniques for restoring a cluster network environment and/or nodes therein are disclosed. It may be appreciated that the cluster network environment may be akin to the cluster network environment 100 of FIG. 1 and/or a cluster associated with cluster fabric 215 of FIG. 2, for example, which may comprise one or more data storage systems, such as data storage systems 102 and 104 of FIG. 1 and/or data storage system 200 of FIG. 2, for example. The cluster network environment may comprise one or more nodes, such as nodes 116 and 118 of FIG. 1 and/or node 202 of FIG. 2, for example. Such nodes may be configured to operate within the cluster network environment based upon a cluster configuration for the cluster network environment (e.g., location of volumes 230 and 232, location of data storage device 234, LUN 238 configuration, network adapter 210 configuration, cluster access adapter 212 configuration, storage adapter 214 configuration, cluster fabric 215 configuration, configurations for nodes on cluster fabric 215, and/or other cluster network information of FIG. 2). Additionally, respective nodes may have corresponding local configurations specifying personalities for the respective nodes. In this way, one or more nodes may operate within the cluster network environment based upon the cluster configuration and/or respective local configurations. Unfortunately, integrity loss may affect the cluster network environment and/or nodes therein. Accordingly, one or more systems and/or techniques provided herein may be implemented to restore the cluster network environment (e.g., cluster network environment 100 of FIG. 1 and/or the cluster associated with cluster fabric 215) and/or nodes therein (e.g., nodes 116 and 118 of FIG. 1 and/or node 202 of FIG. 2).

Figure 3:
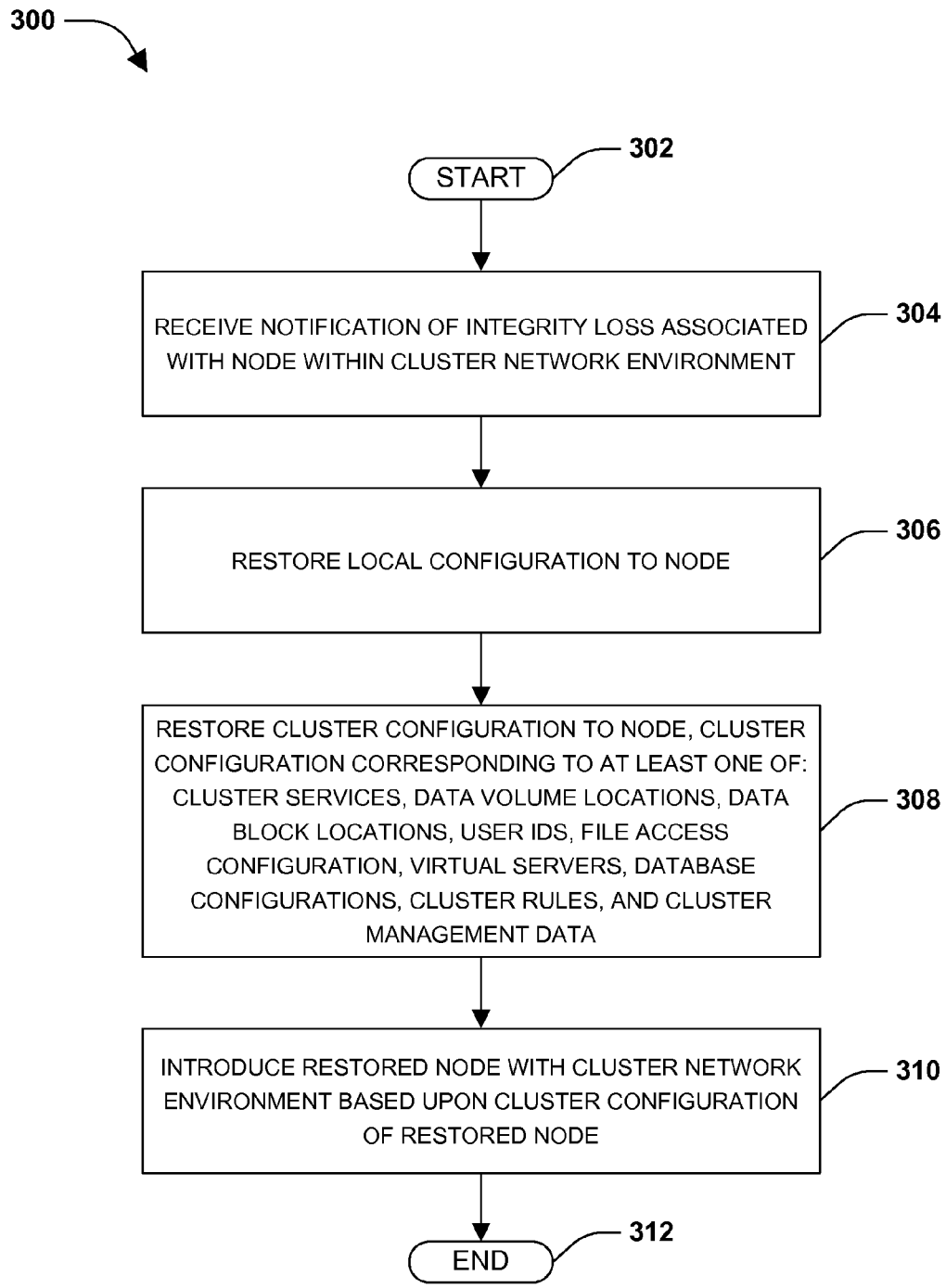
FIG. 3 is a flow chart illustrating an exemplary method of restoring a node of a cluster network environment.
Figure 7A:
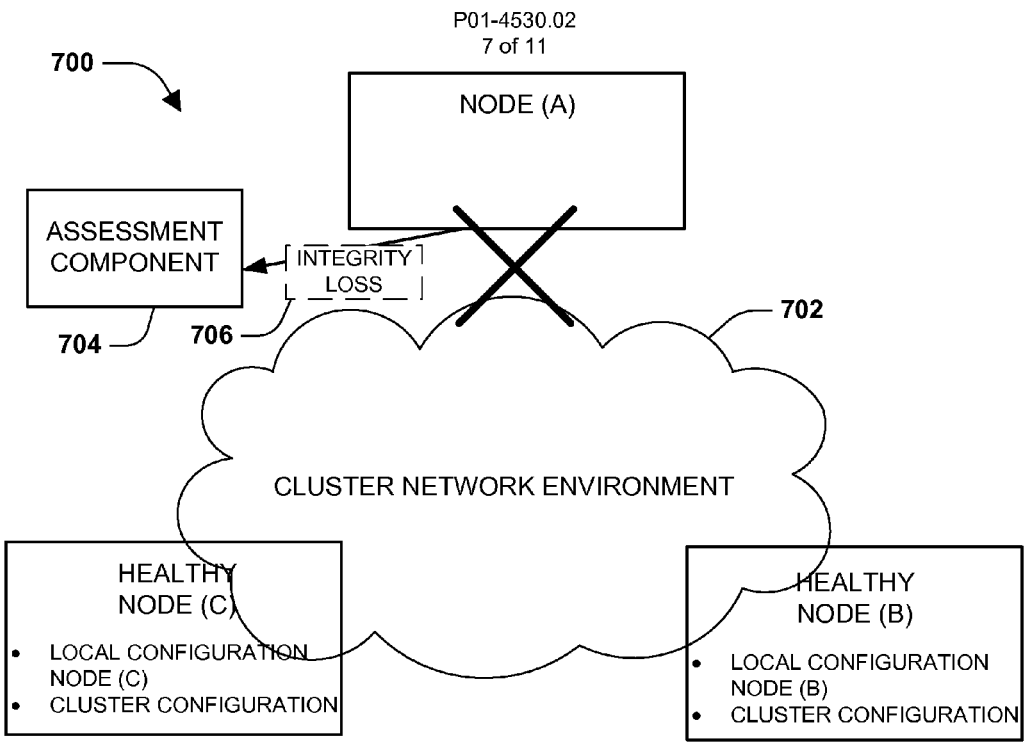
FIG. 7A is a component block diagram illustrating an exemplary system for determining an integrity loss of a node within a cluster network environment.
Figure 7B:
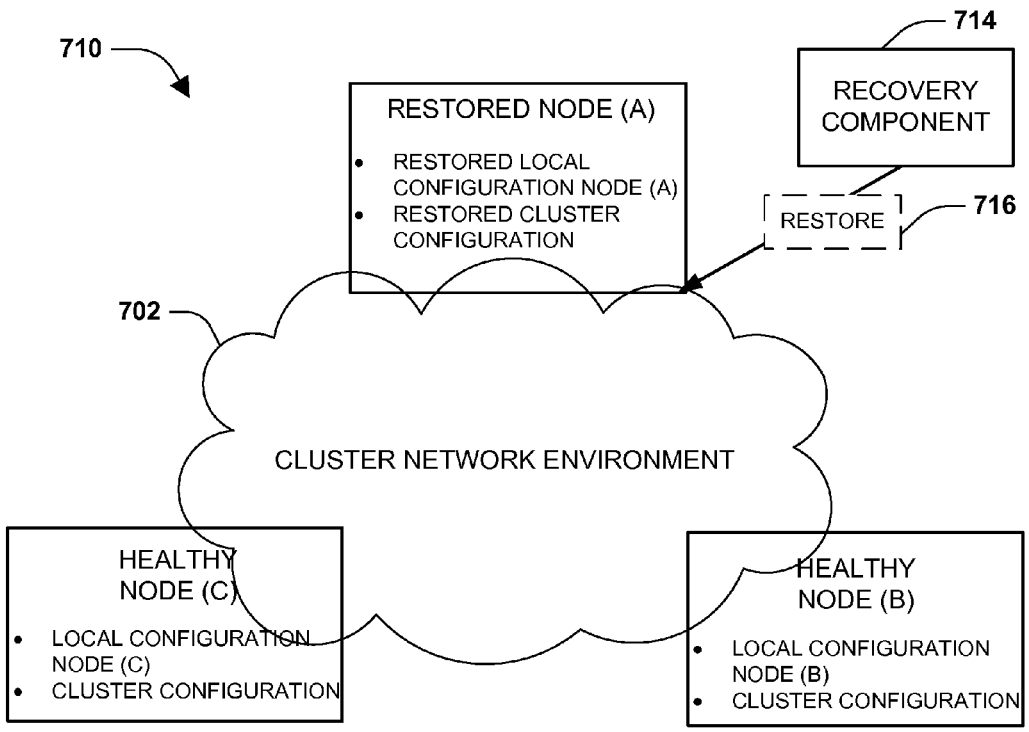
FIG. 7B is a component block diagram illustrating an exemplary system for restoring a node affected by an integrity loss.

One embodiment of restoring a node of a cluster network environment is illustrated by an exemplary method 300 in FIG. 3 (e.g., FIG. 7A and FIG. 7B). At 302, the method starts. At 304, a notification of an integrity loss associated with a node within a cluster network environment may be received. At 306, a local configuration may be restored to the node. The local configuration may correspond to a node name, an IP address, operating system parameters, local data, state information, local identity, and/or other information associated with the node. In one example, the local configuration may be restored using node backup data associated with the node (e.g., node backup data stored at a remote source and/or at a healthy node).

In one example of restoring a local configuration, the node may be isolated from the cluster network environment (e.g., the eligibility of the node to participate in the cluster network environment may be modified). If the integrity loss affected the root volume, then a new root volume may be created (e.g., a create root volume command may be performed), otherwise the current root volume may be retained. Once the node comprises a root volume that is not corrupt, a local configuration for the node may be restored. In one example, configuration files, boot variables, environmental variables, and/or other state information may be restored to the node, such as on the root volume, as specified within the local configuration (e.g., the local configuration may comprise files from a snapshot of the root volume, which may be used to perform the restoration). In another example, if data of a synchronous data replication service (RDB) is corrupt on the node, then restoration of the local configuration may comprise synchronizing the node with the cluster network environment (e.g., an RDB synch command may be performed).

At 308, a cluster configuration may be restored to the node. The cluster configuration may correspond to cluster services, data volume locations, data block locations, user IDs, file access configuration, virtual servers, database configurations, cluster rules, cluster management data, and/or other information relating to the cluster network environment. In one example, the cluster configuration may be restored using cluster backup data from a healthy node within the cluster network environment. In another example, the cluster configuration may be restored using cluster backup data from a remote source (e.g., a remote source accessible using a URL). In another example, the cluster configuration may be restored to the node by synchronizing the failed node to the cluster network environment by executing a cluster join command using the cluster backup data. That is, the cluster configuration may be restored by synchronizing the node with the cluster network environment. In one example of synchronizing the restored node, data replication service processes (e.g., one or more data replication services configured to replicate data, such as user data and/or cluster configuration data) may be stopped at the node so that data replication service directories and/or site list data may be removed from a root volume of the node. A data replication service process may also be restarted to repopulate the data replication service directories and/or site list data. Upon repopulation of the site list data, for example, the node may be rebooted to reinitialize data replication service processes on the node. In another example of synchronizing the restored node, data replication service processes of the restored node may be stopped. Data replication service directories may be removed from a root volume of the restored node. Cluster backup data may be restored to the root volume of the restored node. Data replication service processes may be restarted on the restored node. Data replication service synchronization for the restored node may be performed within the cluster network environment. The restored node may be synchronized with the cluster network environment using a cluster join command, for example.

In another example of restoring a cluster configuration to the node, cluster specific metadata may be specified within the node (e.g., configuration metadata that may be accessible to applications executing on the node). The cluster specific metadata may specify cluster environmental variables (e.g., location of data volumes, IP address of nodes, a list of virtual servers, file security access data for virtual servers, user IDs, services executing on virtual servers, and/or a wide variety of other data associated with a cluster). The cluster environmental variables may be consumed by a cluster application when operating within the cluster network environment (e.g., an application may determine an IP address from which data is to be read).

In one example, the node may be isolated from the cluster network environment before restoring the local configuration and/or restoring the cluster configuration. At 310, the restored node may be introduced to the cluster network environment based upon the cluster configuration of the restored node, such that the restored node may participate within the cluster network environment. Using the cluster configuration may mitigate potential inconsistencies and/or incompatibilities that may occur when synchronizing the node with the cluster network environment. Additionally, cluster services may continue operating during the recovery of the cluster network environment and/or nodes therein. At 312, the method ends.

Figure 4:
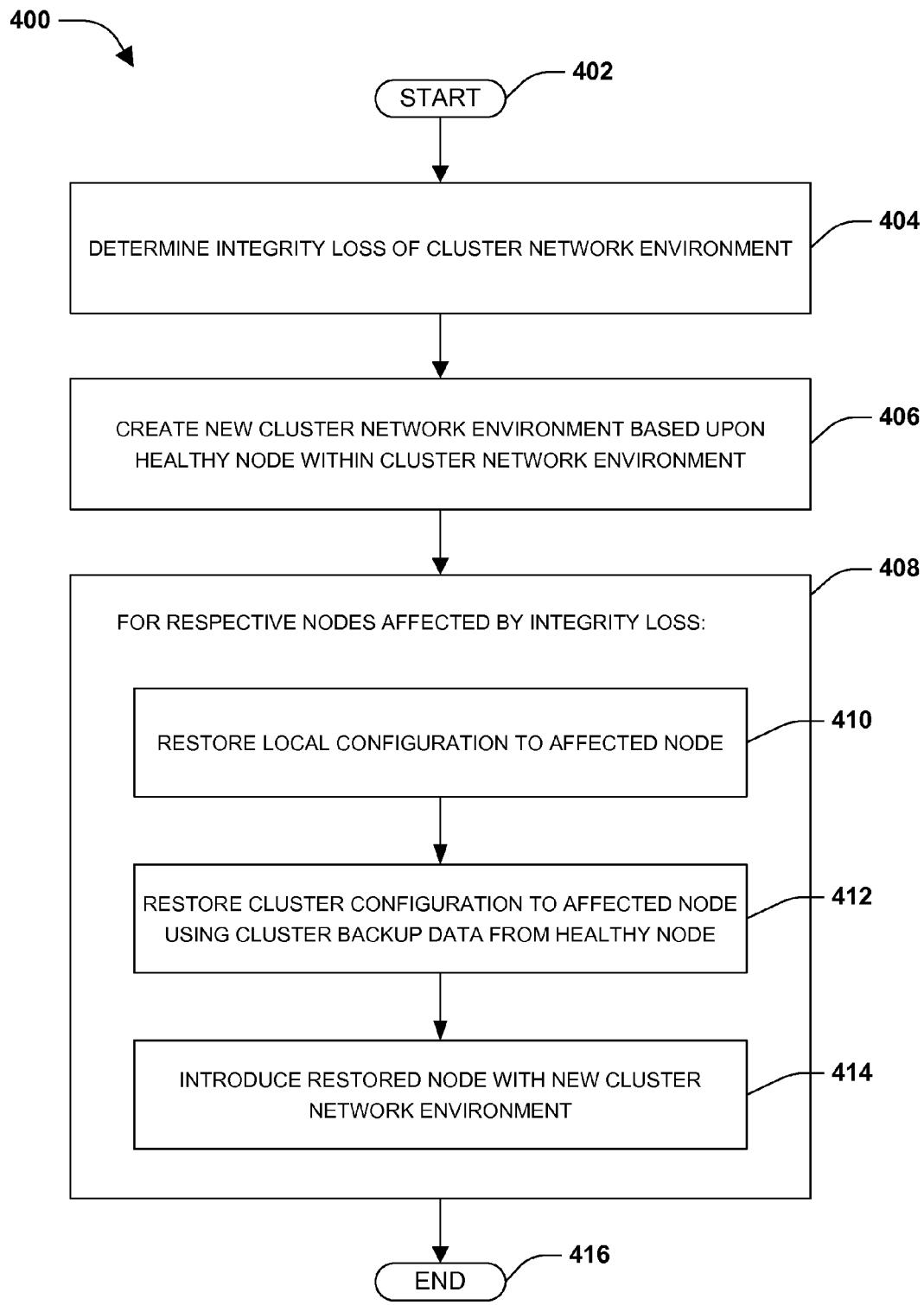
FIG. 4 is a flow chart illustrating an exemplary method of restoring a cluster network environment.
Figure 8A:
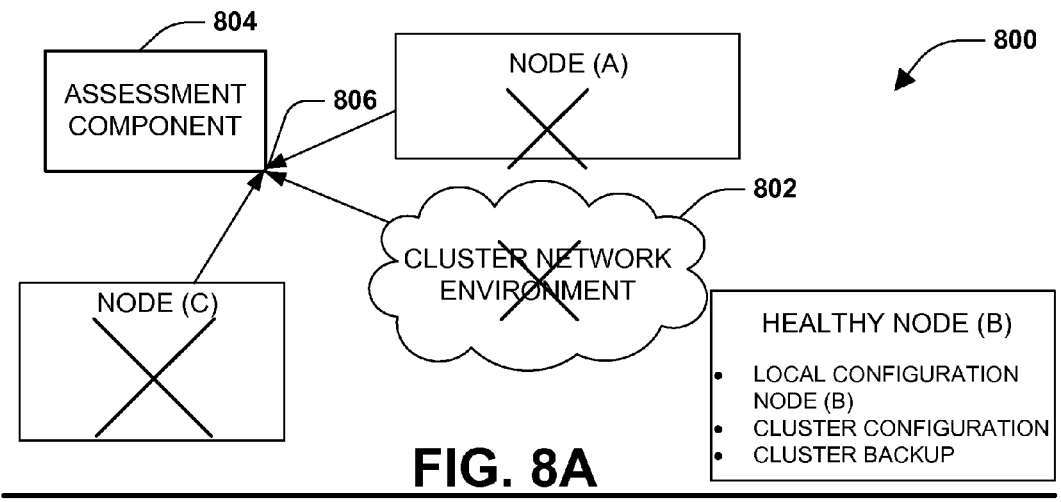
FIG. 8A is a component block diagram illustrating an exemplary system for detecting an integrity loss affecting a cluster backup environment.
Figure 8B:
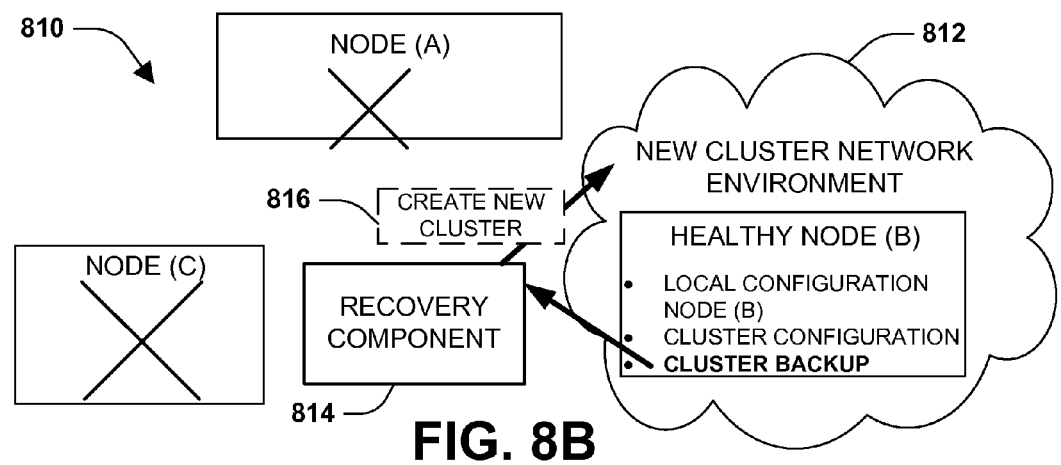
FIG. 8B is a component block diagram illustrating an exemplary system for creating a new cluster network environment using a cluster backup of a healthy node.
Figure 8C:
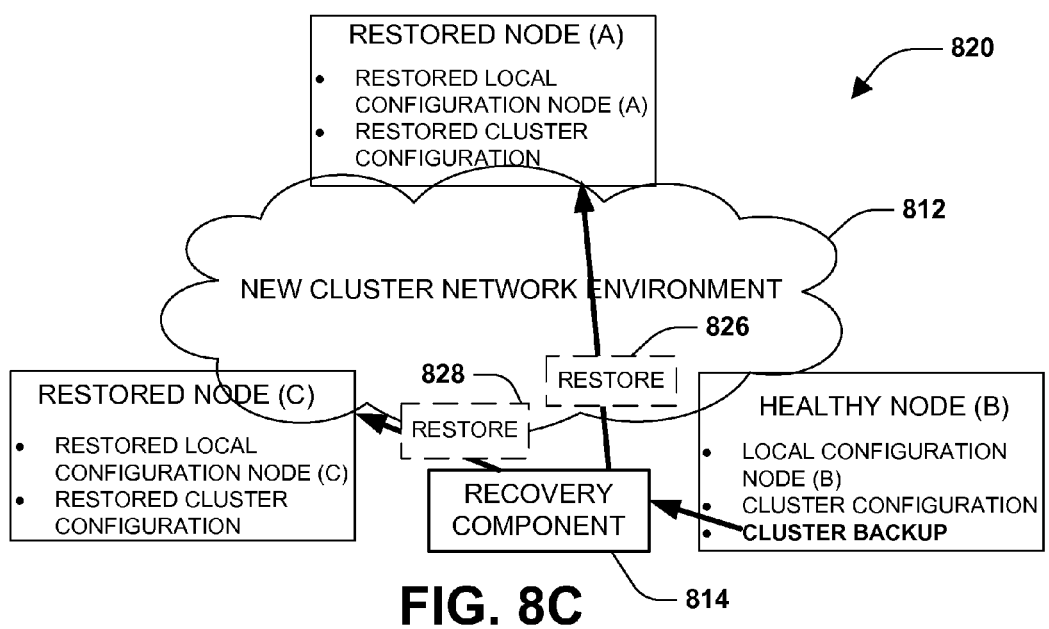
FIG. 8C is a component block diagram illustrating an exemplary system for restoring and/or synchronizing nodes with a new cluster network environment.

One embodiment of restoring a cluster network environment is illustrated by an exemplary method 400 in FIG. 4 (e.g., FIG. 8A-8C). At 402, the method starts. At 404, an integrity loss of a cluster backup environment may be determined (e.g., a health status and/or messaging service may provide a notification of the integrity loss). For example, an integrity loss of the cluster backup environment may be determined based upon determining that a quorum (e.g., a majority) of healthy nodes does not exist within the cluster network environment. At 406, a new cluster network environment may be created based upon a healthy node within the cluster network environment (e.g., a node unaffected by the integrity loss). For example, cluster backup data within the healthy node may be used to create the new cluster network environment (e.g., a one-node cluster comprising the healthy node may be created).

In one example, a healthy node may comprise a node with current backup data, such as cluster backup data, node backup data, a tarball of aggregated local configurations for nodes, and/or a mega tarball of a cluster configuration aggregated with the tarball. In this way, the current backup data may comprise environmental variables, persistent state information, cluster configuration data (e.g., cluster rules, file access configuration, data locations, etc.), RDB data, and/or a variety of other information that may be used to restore failed nodes and/or create a new cluster network environment. For example, the current backup data may be downloaded to a node for use during restoration of the node. In another example, a healthy node may be a node properly operating within the cluster network environment. In another example, the healthy node may be a node that has not experienced a lost disk, lost or corrupt local configuration file, lost or corrupt root volume, corrupt data of a data replication service, a complete failure, etc. In another example, the healthy node may be a node that participates in a cluster quorum of the cluster network environment (e.g., a cluster-wide quorum established among RDB applications and/or nodes).

A 408, for respective nodes affected by the integrity loss, a local configuration may be restored to an affected node, at 410. At 412, a cluster configuration may be restored to the affected node using cluster backup data from the healthy node. The cluster configuration may correspond to cluster services, data volume locations, data block locations, user IDs, file access configuration, virtual servers, database configurations, cluster rules, cluster management data, and/or other information relating to the cluster network environment. In one example, the cluster configuration may be restored by synchronizing the node with the new cluster configuration. At 414, the restored node may be introduced to the new cluster network environment. In one example, unaffected nodes may be synchronized with the new cluster network environment. In this way, the cluster network environment may be restored as the new cluster network environment. At 416, the method ends.

Figure 5:
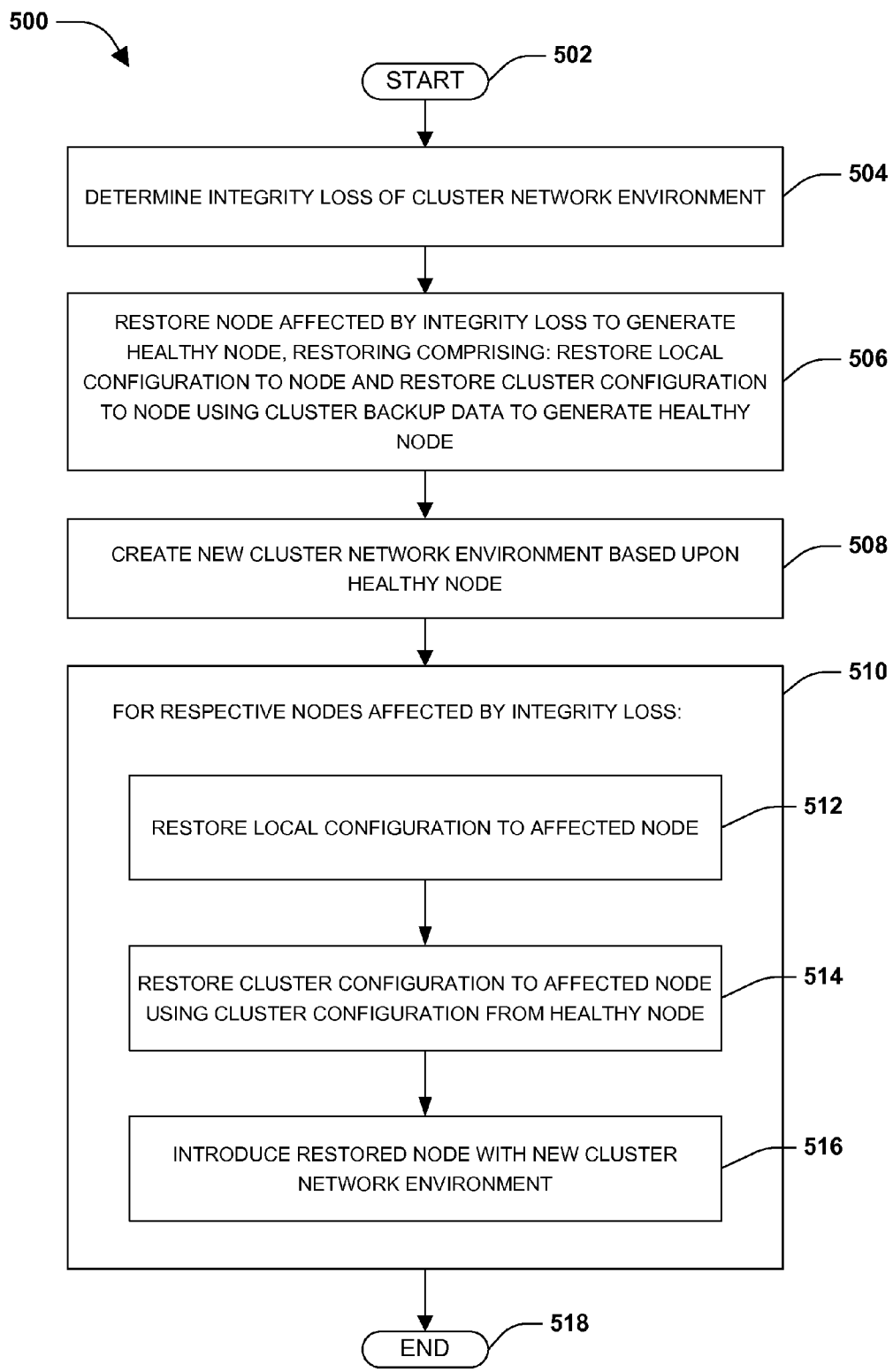
FIG. 5 is a flow chart illustrating an exemplary method of restoring a cluster network environment.
Figure 9A:
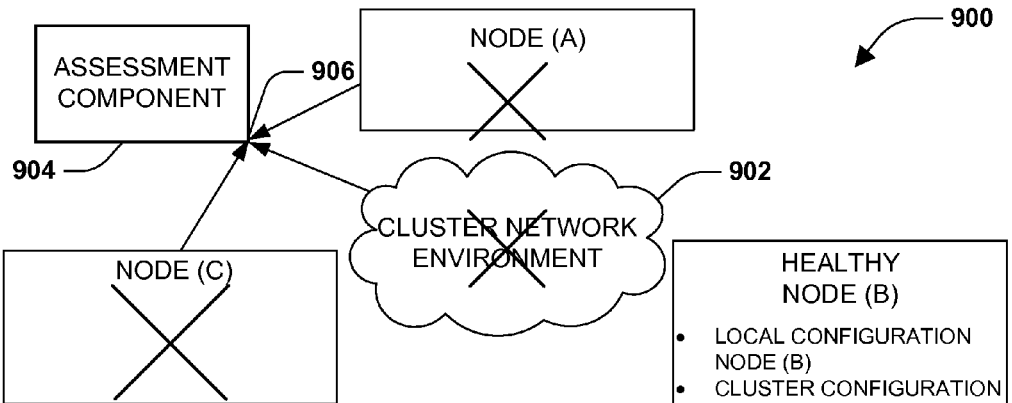
FIG. 9A is a component block diagram illustrating an exemplary system for detecting an integrity loss affecting a cluster backup environment.
Figure 9B:
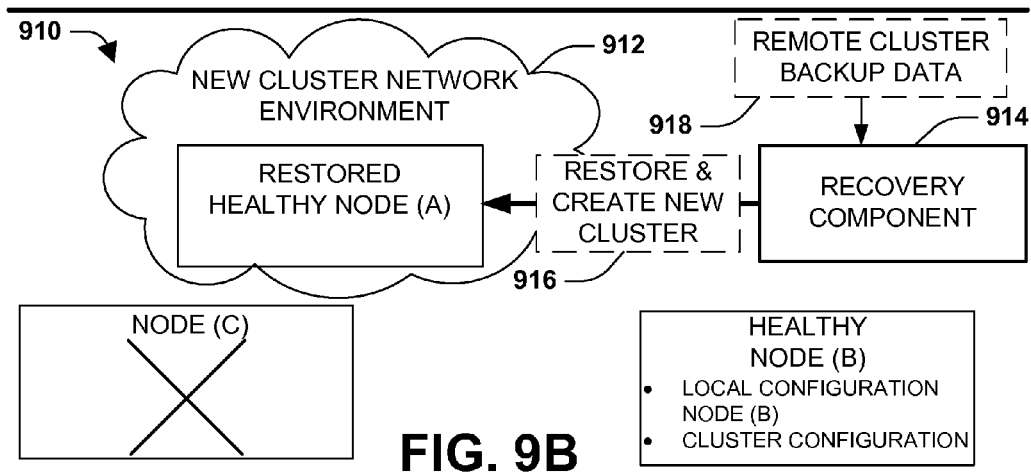
FIG. 9B is a component block diagram illustrating an exemplary system for restoring a node affected by an integrity loss using remote cluster backup data.
Figure 9C:
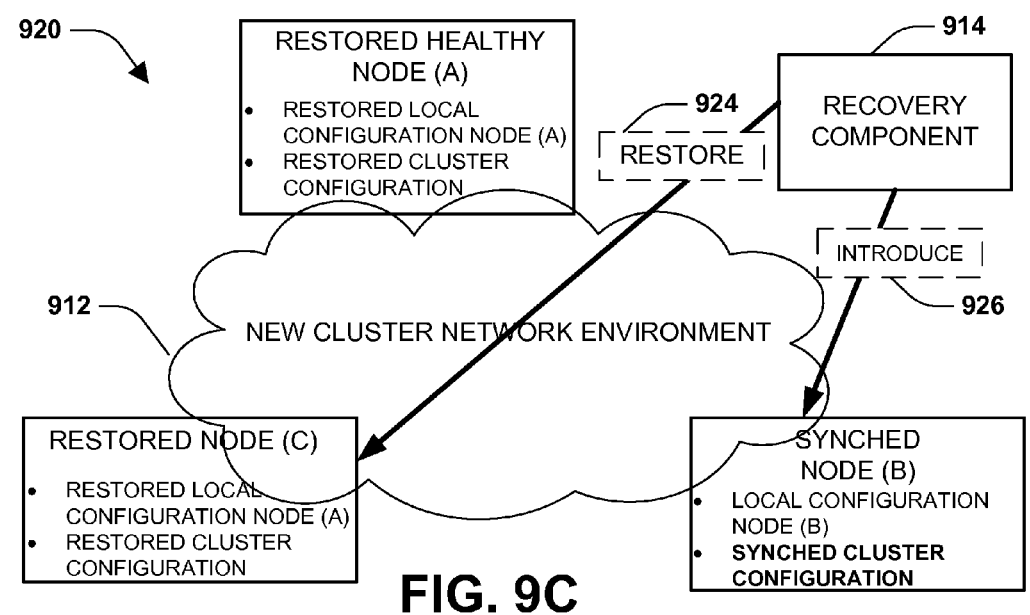
FIG. 9C is a component block diagram illustrating an exemplary system for restoring and/or synchronizing nodes within a new cluster network environment.

One embodiment of restoring a cluster network environment is illustrated by an exemplary method 500 in FIG. 5 (e.g., FIG. 9A-9C). At 502, the method starts. At 504, an integrity loss of a cluster network environment may be determined. At 506, a node affected by the integrity loss may be restored to generate a healthy node (a restored healthy node). The restoration may comprise restoring a local configuration to the node and/or restoring a cluster configuration to the node using cluster backup data. At 508, a new cluster network environment may be created based upon the healthy node (e.g., the restored cluster configuration of the restored healthy node may be used to generate a one-node cluster comprising the restored healthy node). It may be appreciated that remote cluster backup data may be used to restore the cluster configuration to the node and/or to generate the new cluster network environment.

At 510, for respective nodes affected by the integrity loss, a local configuration may be restored to an affected node, at 512. At 514, a cluster configuration may be restored to the affected node using the cluster configuration from the healthy node. At 516, the restored node may be introduced to the new cluster network environment. Additionally, nodes unaffected by the integrity loss may be synchronized with the new cluster network environment using the cluster configuration data from the healthy node. At 518, the method ends.

Figure 6:
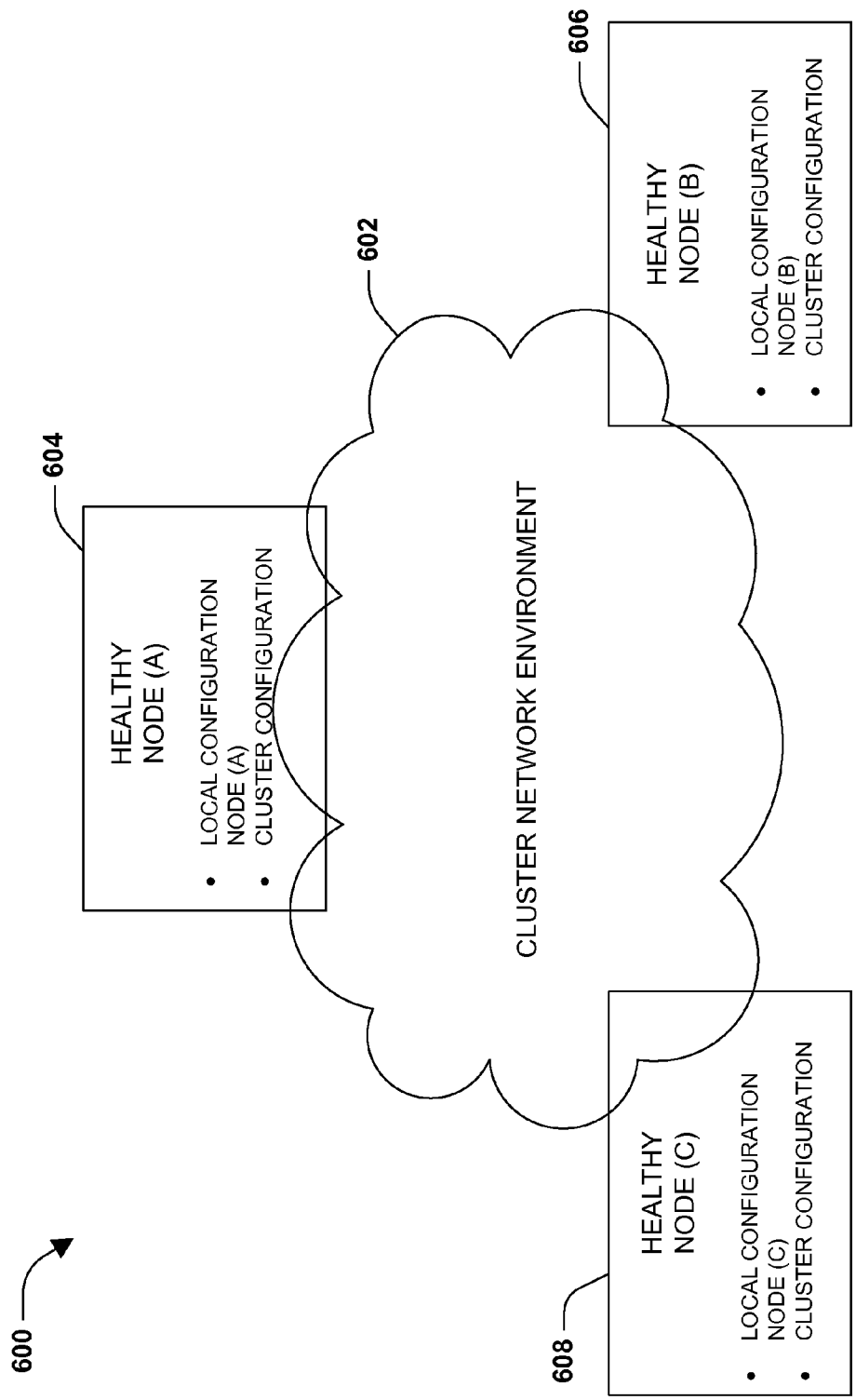
FIG. 6 is an example of a cluster network environment.

FIG. 6 illustrates an example 600 of a cluster network environment 602. In one example, the cluster network environment 602 may be configured as a cluster storage environment comprising a plurality of nodes, such as healthy node (A) 604, healthy node (B) 606, healthy node (C) 608, and/or other nodes not illustrated. The plurality of nodes may be configured to cooperate together as a single coherent storage system. In one example, respective nodes may comprise local configurations specific to respective nodes (e.g., healthy node (A) 604 may comprise a local configuration specific to node (A), healthy node (B) 606 may comprise a local configuration specific to node (B), etc.). Additionally, respective nodes may comprise a cluster configuration specific to the cluster network environment 602 (e.g., healthy node (A) 604, healthy node (B) 606, and/or healthy node (C) 608 may comprise a cluster configuration for the cluster network environment 602). The cluster configuration data, for example, may be used by the respective healthy nodes to synchronize and/or function in a consistent and cooperative manner within the cluster network environment 602.

In one example, one or more healthy nodes within the cluster network environment 602 may comprise node backup data and/or cluster backup data. For example, a healthy node may comprise aggregated node backup data as a tarball file. Additionally, cluster backup data may be aggregated with the tarball file to create a mega tarball file, which may be stored at the healthy node. In this way, healthy node (A) 604, healthy node (B) 606, and/or healthy node (C) 608 may comprise similar backup data (e.g., a similar mega tarball file) that may be used to restore the cluster network environment 602 and/or nodes therein. It may be appreciated, node backup data, cluster backup data, tarball files, and/or mega tarball files may be stored at nodes within the cluster network environment 602 and/or at a remote location.

FIG. 7A illustrates an example of a system 700 configured to determine an integrity loss 706 of a node within a cluster network environment 702. It may be appreciated that the cluster network environment 702 may comprise a plurality of nodes, such as node A, healthy node B, healthy node C, and/or other nodes not illustrated, where respective nodes may comprise a local configuration, a cluster configuration, and/or backup data (e.g., a mega tarball file).

The system 700 may comprise an assessment component 704. The assessment component 704 may be configured to determine whether the integrity loss 706 affected a node, such as node A, within the cluster network environment 702. For example, node A may have a lost or corrupt local configuration file, a lost or corrupt root volume, corrupt data replication service data, a lost disk, a complete failure, etc. In this way, node (A) may be restored by a recovery component (e.g., FIG. 7B).

FIG. 7B illustrates an example of a system 710 configured to restore a node affected by an integrity loss. It may be appreciated that the cluster network environment 702 may comprise a plurality of nodes, such as node A, healthy node B, healthy node C, and/or other nodes not illustrated, where respective nodes may comprise a local configuration, a cluster configuration, and/or backup data (e.g., a mega tarball file). It may be appreciated that an integrity loss may have affected node A (e.g., integrity loss 706 of FIG. 7A).

The system 710 may comprise a recovery component 714. The recovery component 714 may be configured to restore 716 node (A). For example, the recovery component 714 may restore a local configuration to node (A) and/or a cluster configuration to node (A) to create restored node (A). The recovery component 714 may introduce restored node (A) to cluster network environment 702 based upon the restored cluster configuration of restored node (A). In this way, restored node (A) may be able to function in a consistent and cooperative manner within the cluster network environment 702.

FIG. 8A illustrates an example of a system 800 configured to detect an integrity loss 806 affecting a cluster backup environment 802. It may be appreciated that the cluster network environment 802 may comprise a plurality of nodes, such as node A, healthy node B, node C, and/or other nodes not illustrated, where respective nodes may comprise a local configuration, a cluster configuration, and/or backup data (e.g., a mega tarball file).

The system 800 may comprise an assessment component 804. The assessment component 804 may be configured to detect whether the integrity loss 806 affected the cluster network environment 802. For example, the integrity loss 806 may have affected the cluster network environment 802 such that a quorum of healthy nodes does not exist (e.g., healthy node (B) is healthy, while node (A) and node (C) may be affected by the integrity loss 806). In this way, a new cluster network environment may be created from a healthy (e.g., FIG. 8B). Additionally, affected nodes may be restored and synchronized with the new cluster network environment (e.g., FIG. 8C).

FIG. 8B illustrates an example of a system 810 configured to create 816 a new cluster network environment 812 using a cluster backup of a healthy node. It may be appreciated that an integrity loss may have affected an original cluster network environment comprising node (A), healthy node (B), node (C), and/or other nodes not illustrated (e.g., integrity loss 806 of FIG. 8A).

The system 810 may comprise a recovery component 814. The recovery component 814 may be configured to create 816 the new cluster network environment 812 based upon a healthy node, such as healthy node (B). For example, the recovery component 814 may create 816 the new cluster network environment 812 as a one-node cluster using cluster backup data stored within healthy node (B). In this way, the new cluster network environment 812 may be created, such that node (A) and/or node (C) may be restored (e.g., synchronized) and/or introduced to the new cluster network environment 812 (e.g., FIG. 8C).

FIG. 8C illustrates an example of a system 820 configured to restore (e.g., synchronize) and/or introduce nodes to a new cluster network environment 812. It may be appreciated that the new cluster network environment 812 may have been created (e.g., FIG. 8B) using a healthy node (B) after a determination that an integrity loss affected an original cluster network environment (e.g., FIG. 8A).

The system 820 may comprise a recovery component 814. The recovery component 814 may be configured to restore nodes affected by the integrity loss. For example, the recovery component may restore 826 node (A) to generate restored node (A). In particular, the recovery component 814 may restore a local configuration to node (A). Additionally, the recovery component 814 may restore a cluster configuration to node (A) using cluster backup data from healthy node (B). In another example, the recovery component 814 may synchronize node (A) with the new network cluster 812 to restore the cluster configuration to node (A). In this way, the recovery component 814 may introduce restored node (A) to the new cluster network environment 812. The recovery component may restore 828 node (C) to generate restored node (C). In particular, the recovery component 814 may restore a local configuration to node (C). Additionally, the recovery component 814 may restore the cluster configuration to node (C) using the cluster backup data from healthy node (B). In another example, the recovery component 814 may synchronize node (C) with the new network cluster 812 to restore the cluster configuration to node (C). In this way, the recovery component 814 may introduce restored node (C) to the new cluster network environment 812. Thus, restored node (A), healthy node (B), and restored node (C) may be able to function in a consistent and cooperative manner within the new cluster network environment 812. It may be appreciated that the recovery component 814 may be configured to synchronize and/or introduce nodes that were not affected by the integrity loss to the new cluster network environment 812.

FIG. 9A illustrates an example of a system 900 configured to detect an integrity loss 906 affecting a cluster backup environment 902. It may be appreciated that the cluster network environment 902 may comprise a plurality of nodes, such as node A, healthy node B, node C, and/or other nodes not illustrated, where respective nodes may comprise a local configuration, a cluster configuration, and/or backup data (e.g., a mega tarball file).

The system 900 may comprise an assessment component 904. The assessment component 904 may be configured to detect whether the integrity loss 906 affected the cluster network environment 902. For example, the integrity loss 906 may have affected the cluster network environment 902 such that a quorum of healthy nodes does not exist (e.g., healthy node (B) is healthy, while node (A) and node (C) may be affected by the integrity loss 906). In this way, a new cluster network environment may be created from a restored healthy node (e.g., FIG. 9B). Additionally, affected nodes may be restored (e.g., synchronized to restore cluster configuration to the affected nodes) and/or introduced to the new cluster network environment, and/or unaffected nodes may be synchronized with the new cluster network environment (e.g., FIG. 9C).

FIG. 9B illustrate an example of a system 910 configured to restore a node affected by an integrity loss using remote cluster backup data 918, and create a new cluster network environment based upon the restored healthy node. It may be appreciated that an integrity loss may have affected an original cluster network environment comprising node (A), healthy node (B), node (C), and/or other nodes not illustrated (e.g., integrity loss 906 of FIG. 9A).

The system 910 may comprise a recovery component 914. The recovery component 914 may be configured to restore a node affected by the integrity loss. For example, recovery component 914 may restore node (A) to create restored healthy node (A) by restoring a local configuration to node (A) and/or restoring a cluster configuration to node (A) using the remote cluster backup data 918 (e.g., restore & create new cluster 916). Additionally, the recovery component 914 may create a new cluster network environment 912 based upon the restored healthy node (A) (e.g., restore & create new cluster 916). In this way, the new cluster network environment 912 comprising restored healthy node (A) may be created, such that affected nodes, such as node (C), may be introduced to the new cluster network environment 912 and/or healthy nodes, such as healthy node (B), may be introduced to the new cluster network environment 912 (e.g., FIG. 9C).

FIG. 9C illustrates an example of a system 920 configured to restore and/or introduce nodes within a new cluster network environment 912. It may be appreciated that a restored healthy node (A), restored from remote cluster backup data (e.g., FIG. 9B), may have been used to create the new cluster network environment 912 after a determination that an integrity loss affected an original cluster network environment (e.g., FIG. 9A).

The system 920 may comprise a recovery component 914. The recovery component 914 may be configured to restore and/or introduce nodes to the new cluster network environment 912. For example, the recovery component 914 may restore 924 node (C) to generate restored node (C). In particular, the recovery component 914 may restore a local configuration to node (C). In one example, the recovery component 914 may restore a cluster configuration to node (C) using cluster configuration data of restored healthy node (A). In another example, the recovery component 914 may restore the cluster configuration to node (C) by synchronizing node (C) with the new cluster network environment 912. In this way, the recovery component 914 may introduce restored node (C) to the new cluster network environment 912. The recovery component 914 may synchronize 926 healthy node (B) with the new cluster network environment 912 as synched node (B) by synchronizing cluster configuration data of healthy node (B) with cluster configuration data of restored healthy node (A). Thus, restored healthy node (A), synched node (B), and restored node (C) may be able to function in a consistent and cooperative manner within the new cluster network environment 912.

Figure 10:
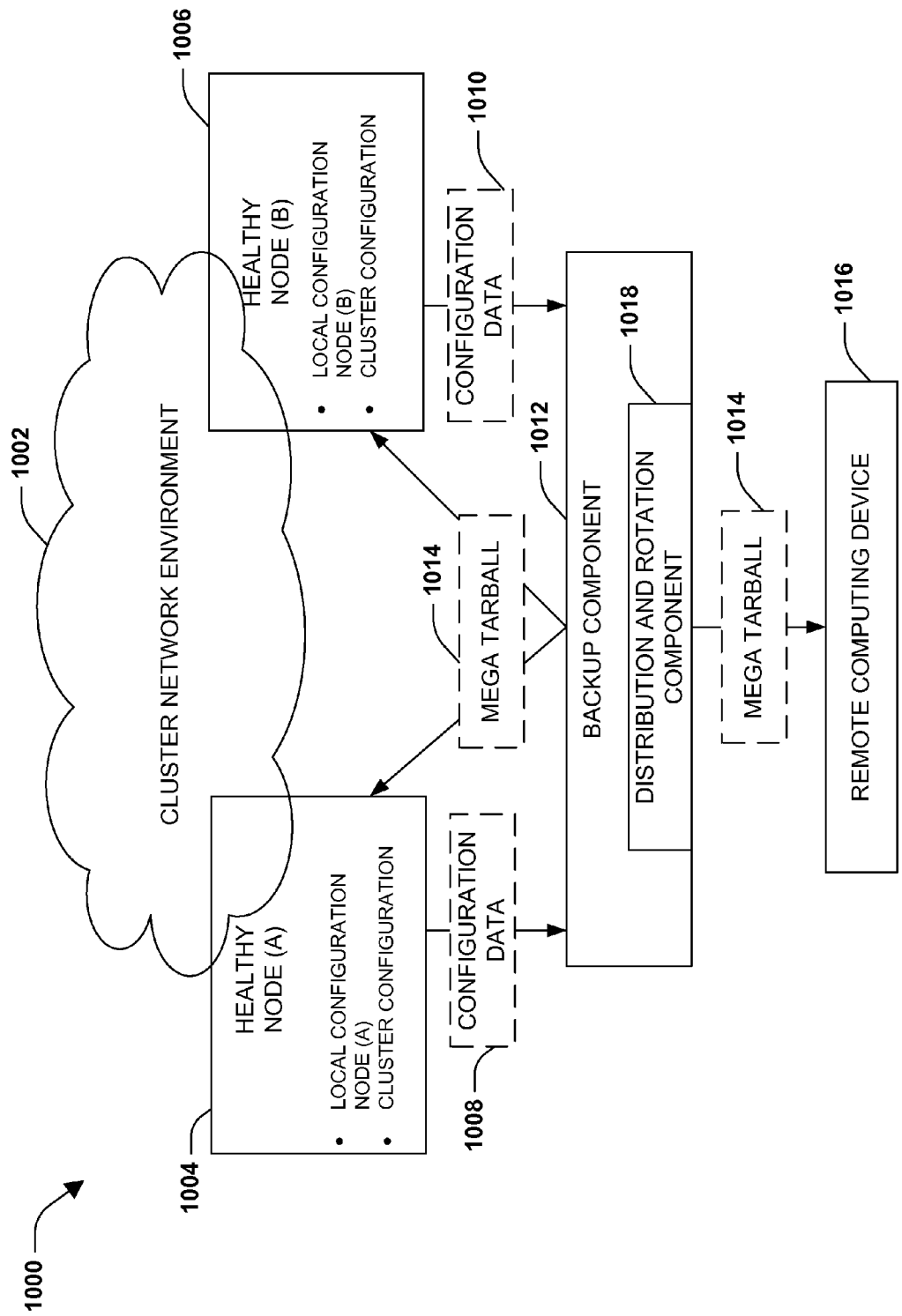
FIG. 10 is a component block diagram illustrating an exemplary system for backing up a cluster configuration and/or local configuration of one or more nodes within a cluster network environment.

FIG. 10 illustrates an example of a system 1000 configured to backup a cluster configuration and/or local configurations of one or more nodes within a cluster network environment 1002. It may be appreciated that the cluster network environment 1002 may comprise a plurality of nodes, such as healthy node (A) 1004, healthy node (B) 1006, and/or other nodes not illustrated, where respective nodes may comprise a local configuration, a cluster configuration, and/or backup data.

The system 1000 may comprise a backup component 1012. The backup component 1012 may be configured to generate node backup data of one or more nodes and/or cluster backup data of the cluster network environment 1002. For example, the backup component 1012 may generate node backup data for healthy node (A) using configuration data 1008. The backup component 1012 may generate node backup data for healthy node (B) using configuration data 1010. The backup component 1012 may generate cluster backup data for cluster network environment 1002 using configuration data 1008 and/or configuration data 1010. It may be appreciated that configuration data may comprise local configuration of a node, cluster configuration, and/or other information.

In one example, the backup component 1012 may be configured to store the node backup data and/or the cluster backup data at a remote source outside of the cluster network environment, such as the remote computing device 1016. In another example, the backup component 1012 may be configured to store the node backup data and/or the cluster backup data within one or more nodes of the cluster network environment 1002.

In one example, the backup component 1012 may be configured to aggregate node backup data of one or more nodes into a tarball file using a file replication service (e.g., node backup data associated with healthy node (A), node backup data associated with healthy node (B), and/or node backup data of other nodes). The backup component 1012 may store the tarball file at the remote computing device 1016 and/or within one or more nodes of the cluster network environment 1002.

In another example, the backup component 1012 may be configured to generate a mega tarball file 1014. For example, the backup component 1012 may aggregate node backup data of one or more nodes into a tarball file. Additionally, the backup component 1012 may aggregate cluster backup data into the tarball file to generate the mega tarball file 1014. The backup component 1012 may store the mega tarball file 1014 at the remote computing device 1016 and/or within one or more nodes of the cluster network environment 1002. In this way, respective nodes may comprise backup data, such as a tarball file, a mega tarball file, node backup data, and/or cluster backup data, that may be used to restore the cluster network environment 1002 and/or nodes therein.

In another example, the backup component 1012 may monitor local jobs performing local backup creation by polling such local jobs. Upon creation of local backups on nodes, a file replication service may be invoked to retrieve the local backups and aggregate the local backups into a tarball. A cluster configuration may be aggregated into the tarball to create a mega tarball. The mega tarball may be distributed across one or more nodes within the cluster network environment based upon a rotation schedule, for example. In one example of restoration, the mega tarball may be retrieved from one or more nodes to restore a node affected by an integrity loss (e.g., the mega tarball may be stored as metadata within a node that may be retrieved by a recovery component).

In another example, duplicate backups may be stored throughout the cluster network environment, such that backup data corresponding to local configurations of nodes and/or a cluster configuration may be available from one or more nodes. The backup component 1012 may be configured to rotation backup data, such as mega tarball 1014, between nodes based upon a rotation schedule, for example.

In one example, the backup component 1012 may comprise a distribution and rotation component 1018 configured to duplicate the mega tarball 1014 to one or more nodes within the cluster network environment 1002. The distribution and rotation component 1018 may be configured to remove undesirable backups (e.g., older backups) from nodes within the cluster network environment, while maintaining availability of the mega tarball 1014. In another example, the distribution and rotation component 1018 may be a component that is separate and apart from the backup component 1012.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 11:
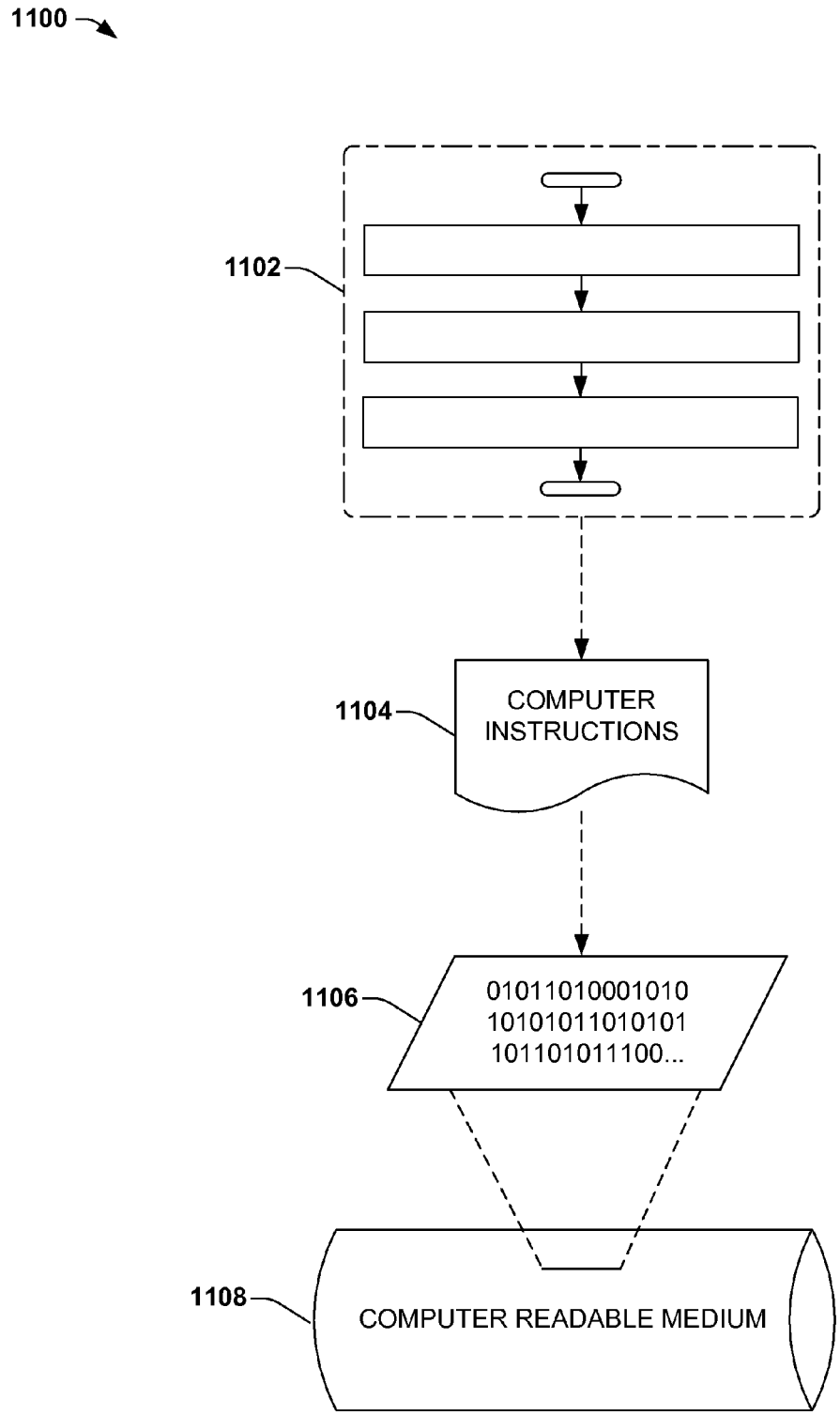
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 300 of FIG. 3 or method 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for restoring a node of a cluster network environment, comprising:
   identifying an integrity loss associated with a node within a cluster network environment; and
   reviving the node as a restored node, the reviving comprising:
      restoring a local configuration to the node;
      restoring a cluster configuration to the node, the cluster configuration corresponding to cluster-aware information; and
      introducing the restored node, corresponding to the node having the restored local configuration and the restored cluster configuration, to the cluster network environment based upon the cluster configuration of the restored node.

2. The method of claim 1, the restoring a local configuration comprising:
   specifying a value for an environmental variable on the node, the environmental variable comprising at least one of a device name, an IP address, an operating system parameter, local data, state information, or a local identity for the node.

3. The method of claim 1, the restoring a local configuration comprising:
   restoring the local configuration using node backup data associated with the node.

4. The method of claim 1, the restoring a cluster configuration comprising:
   restoring the cluster configuration using cluster backup data from a healthy node within the cluster network environment.

5. The method of claim 1, the restoring a cluster configuration comprising:
   restoring the cluster configuration using cluster backup data from a remote source using a URL, the cluster network environment not comprising the remote source.

6. The method of claim 1, the restoring a cluster configuration comprising:
   synchronizing the node with cluster operating data of the cluster network environment to restore the cluster configuration to the node.

7. The method of claim 1, the restoring a cluster configuration comprising:
   specifying a value for a cluster environment variable on the node, the cluster environment variable consumed by a cluster application for operation within the cluster network environment.

8. The method of claim 1, the cluster configuration comprising at least one of cluster-aware information associated with a second node within the cluster network environment, a cluster service, a data volume location, a data block location, a user ID, a file access configuration, virtual server information, a database configuration, a cluster rule, or cluster management data.

9. A method for restoring a cluster network environment, comprising:
   identifying an integrity loss of a cluster network environment;
   creating a new cluster network environment based upon a healthy node within the cluster network environment; and
   for respective nodes affected by the integrity loss:
      reviving an affected node as a restored node, the reviving comprising:
         restoring a local configuration to the affected node;
         restoring a cluster configuration to the affected node using cluster backup data from the healthy node; and introducing the restored node, corresponding to the affected node having the restored local configuration and the restored cluster configuration, to the new cluster network environment.

10. The method of claim 9, the cluster configuration corresponding to at least one of:
   cluster-aware information associated with a second node within the cluster network environment;
   a cluster service;
   a cluster rule; or
   cluster management data.

11. The method of claim 9, the identifying an integrity loss comprising:
   determining a quorum of healthy nodes does not exist within the cluster network environment.

12. A system for restoring one or more nodes of a cluster network environment, comprising:
   an assessment component configured to:
      determine whether an integrity loss affected a node within a cluster network environment; and
   a recovery component configured to:
      revive the node as a restored node, comprising:
         restoring a local configuration to the node;
         restoring a cluster configuration to the node; and
         introducing the restored node, corresponding to the node having the restored local configuration and the restored cluster configuration, to the cluster network environment based upon the cluster configuration of the restored node.

13. The system of claim 12, comprising:
   a backup component configured to:
      generate node backup data of the node before the integrity loss; and
      generate cluster backup data of the cluster network environment.

14. The system of claim 13, the backup component configured to:
   store at least one of the node backup data or the cluster backup data at a remote source not comprised within the cluster network environment.

15. The system of claim 13, the backup component configured to:
   store at least one of the node backup data or the cluster backup data at one or more additional nodes within the cluster network environment.

16. The system of claim 13, the backup component configured to:
   aggregate a plurality of node backup data into a tarball file using a file replication service.

17. The system of claim 16, the backup component configured to:
   aggregate the cluster backup data into the tarball file to generate a mega tarball file.

18. The system of claim 12, the assessment component configured to:
   determine whether the integrity loss affected the cluster network environment.

19. The system of claim 18, the recovery component configured to:
   responsive to the integrity loss affecting the cluster network environment:
      create a new cluster network environment based upon a healthy node within the cluster network environment; and
      revive one or more affected nodes for introduction into the new cluster network environment.

20. The system of claim 18, the recovery component configured to:
   responsive to the integrity loss affecting the cluster network environment:
      revive the node as a healthy node;
      create a new cluster network environment based upon the healthy node; and
      revive one or more affected nodes for introduction into the new cluster network environment.

* * * * *